United States Patent [19]

Kitano et al.

[11] Patent Number: 4,899,183
[45] Date of Patent: Feb. 6, 1990

[54] IMAGE FORMING APPARATUS

[75] Inventors: Hirohisa Kitano; Itaru Saito; Ken Matsubara; Kouichi Shingaki; Tomohiko Masuda, all of Osaka, Japan

[73] Assignee: Minolta Camera Kabushiki Kaisha, Osaka, Japan

[21] Appl. No.: 307,738

[22] Filed: Feb. 7, 1989

[30] Foreign Application Priority Data

Feb. 8, 1988 [JP] Japan ................................ 63-26754

[51] Int. Cl.$^4$ ............................................ G01D 15/00
[52] U.S. Cl. .................................... 346/154; 346/160
[58] Field of Search ................. 346/154, 160, 107 R, 346/108; 364/518, 519; 358/300, 302; 350/333

[56] References Cited

U.S. PATENT DOCUMENTS

| | | | |
|---|---|---|---|
| 4,154,505 | 5/1979 | Kato et al. | 346/160 |
| 4,697,889 | 10/1987 | Takubo et al. | 346/160 |
| 4,803,565 | 2/1989 | Teshigawara et al. | 346/160 |
| 4,823,151 | 4/1989 | Miura | 346/154 |

Primary Examiner—Arthur G. Evans
Attorney, Agent, or Firm—Burns, Doane, Swecker & Mathis

[57] ABSTRACT

The present invention relates to an image forming apparatus which comprises an optical shutter array having a plurality of optical shutters constructed of material possessing electro-optical effects, polarizing member provided on the entering light side of the optical shutter array, analyzing member provided on the exiting light side of the optical shutter array, actuation voltage impression means for applying an actuation voltage to the optical shutter array based on image signals, a photosensitive member on which an electrostatic latent image is formed by exposure to light transmitted through the optical shutter array, detecting means for detecting a decayed surface potential of the photosensitive member induced by light exposure, compensating means, when the detected value by the detecting means is greater than a predetermined reference value, for changing the actuation voltage applied to the optical shutters until said detected value is less than the reference value, control means, upon detection of the detected value to be less than said reference value, for setting the compensated voltage as a compensated actuation voltage to be applied to the optical shutter array, and which applies the compensated actuation voltage to optical shutters in accordance with the type of light generated by the light source and the spectral sensitivity of the photosensitive member.

7 Claims, 10 Drawing Sheets

IMAGE FORMING APPARATUS

BACKGROUND OF THE INVENTION

1. Field of the Invention

The present invention relates to an image forming apparatus which conducts light from a light source to an optical shutter array constructed of PLZT or similar material possessing electro-optical effects, applies an actuation voltage to appropriate optical shutters based on image signals, thereby allowing light to be transmitted therethrough so as to form an electrostatic latent image on a photosensitive member, and more specifically relates to an image forming apparatus which applies a suitable actuation voltage to optical shutters in accordance with the type of light generated by the light source and the spectral sensitivity of the photosensitive.

2. Description of Related Arts

Optical shutters constructed of PLZT or like material possessing electro-optical effects, in principle, pass light generated by a light source 1 through a polarizer 2 which is the first polarizing plate to optical shutters 3, as shown in FIG. 1, such that when an actuation voltage from a power source is applied to electrodes 4 provided on both sides of said optical shutters 3, the light entering said optical shutters 3 is polarized and transmitted through an analyzer 6 which is a second polarizing plate.

The use of such optical shutter arrays having the aforesaid characteristics as writing devices in image forming apparatus has heretofore been investigated. Conventionally, light from a light source passes through a polarizer and is transmitted to an optical shutter array, whereupon an actuation voltage is applied to the appropriate optical shutters based on image signals, the transmitted light is polarized, passes through an analyzer and thereafter said transmitted light forms an electrostatic latent image on a photosensitive member.

When an electrostatic latent image is formed on a photosensitive member, therefore, it is desirable that the light transmitted from the optical shutter be of high intensity and have characteristics which coincide with the spectral sensitivity of the photosensitive member.

Optical shutter characteristics are shown below in Equation 1, wherein the intensity I of the light transmitted from the optical shutter is expressed relative to the intensity Io of the light entering said optical shutter after passing through a polarizer.

$$I/I_o = \mathrm{Sin}^2(\pi L N^3 R E^2 / 2\lambda) \quad [1]$$

[In the equation, L is the optical path length, n is the refractive index, R is the Kerr constant, E is the electric field strength, and $\lambda$ is the light wavelength.]

As shown in Eq. 1, the intensity I of the light transmitted from the optical shutter changes according to the electric field strength E induced by the actuation voltage and the light wavelength $\lambda$.

Therefore, to increase the intensity I of the light transmitted from the optical shutter, the actuation voltage must be altered in accordance with the wavelength $\lambda$ of the light produced by the light source.

When a monochromatic light source is used which produces light of a single wavelength, an optimum actuation voltage to apply to the optical shutters can be readily determined. When a white light light source such as a halogen or xenon lamp is used, however, the light generating from said light source has a wide range of wavelengths, so that the quantity of light at each wavelength must be considered to determined the optimum actuation voltage.

In addition, even though the actuation voltage is set to maximize the intensity I of the transmitted light, the characteristics of said transmitted light may not coincide with the spectral sensitivity of the photosensitive member so that the optimum actuation voltage is not set for the exposure of the photosensitive member and the formation of an electrostatic latent image thereon. Therefore, the characteristics of the entering light and transmitted light as well as the spectral sensitivity of the photosensitive member must be considered.

Thus, the application of an optimum actuation voltage to the optical shutters so as to expose a photosensitive member and form an electrostatic latent image thereon makes the operation of the image forming apparatus extremely complex.

The use of halogen and xenon lamps as representative examples of white light sources are described hereinafter.

First, the spectral (energy) distribution in a specific wavelength range was investigated for light generated by halogen and xenon lamps as lights sources, and the results are shown in FIG. 2. In FIG. 2, item 1 shows the spectral energy distribution for a halogen lamp at a distribution temperature of 3,400 mK, and item 2 shows the distribution for a xenon lamp at peak energy (100%) within the visible light range.

FIG. 3, on the other hand, shows the spectral sensitivities of three representative types of photosensitive members.

Comparison of the spectral energy distributions of light generated from halogen and xenon lamps shown in FIG. 2, and the spectral sensitivity characteristics of photosensitive members A, B and C shown in FIG. 3 clearly shows that the aforesaid spectral distributions and spectral sensitivity characteristics did not necessarily coincide.

Thus, setting the actuation voltage according to Eq. 1 based on the wavelength at which the spectral energy distribution is maximized for the aforesaid light sources does not necessarily produce the optimum actuation voltage for exposure of the photosensitive member.

Halogen and xenon lamp light wavelength $\lambda$ was set at 650 nm, 550 nm and 450 nm and suitable actuation voltages were determined for each using Eq. 1. The thus derived actuation voltages were applied to the optical shutters and spectral energy distributions were determined for the light transmitted from said optical shutters within a fixed wavelength range.

The results of the investigation of the halogen lamp are shown in FIG. 4 and the xenon lamp in FIG. 5. In the figures, 1 is the 650 nm setting, 2 is the 550 nm setting and 3 is the 450 nm setting.

For example, when considering exposure of photosensitive member B of FIG. 3 using a xenon lamp as the light source, it is apparent that spectral energy distribution 3 of FIG. 5 more closely coincides with the spectral sensitivity of the photosensitive member than does spectral distribution 1. It is therefore desirable that, in the case, light wave $\lambda$ be set at 650 nm in determining the actuation voltage to be applied to the optical shutters. When another photosensitive member is used, however, the application to the optical shutters of the actuation voltage set for photosensitive member B may not necessarily be the optimum actuation voltage for exposure of the photosensitive member because the spectral characteristics of said photosensitive member differ from those of the aforesaid photosensitive member B. Conversely, when the light source is changed, the application of the actuation voltage determined as described above may be undesirable for the exposure of the photosensitive member even if photosensitive member B is again used.

In the aforesaid image forming apparatus, therefore, the spectral energy distribution of the light source and the spectral sensitivity characteristics of the photosensitive member must be checked each time an electrostatic latent image is formed on the photosensitive member in order to apply the optimum actuation voltage to the optical shutters. The aforesaid process makes the operation of the image forming apparatus under optimum conditions extremely complex.

SUMMARY OF THE INVENTION

In view of the aforesaid limitations, an object of the present invention is to provide an image forming apparatus which operates at optimum conditions to apply a suitable actuation voltage to the optical shutters to form an electrostatic latent image on a photosensitive member, without the necessity of each time measuring the characteristics of the light generated by the light source or the spectral sensitivity of the photosensitive member so as to set said suitable actuation voltage.

The present invention relates to an image forming apparatus comprising an optical shutter array having a plurality of optical shutters constructed of material possessing electro-optical effects, polarizer provided on the entering light side of the optical shutter array, analyzer provided on the exiting light side of the optical shutter array, actuation voltage impression means for applying an actuation voltage to the optical shutter array based on image signals, photosensitive member for forming an electrostatic latent image by exposure to light transmitted through the optical shutter array, detection means for detecting a decrease in the surface potential of the photosensitive member induced by light exposure, and a control means which, when the surface potential detected by the detection means is greater than a predetermined reference value, sequentially modifies the voltage applied to the optical shutters until said detected value is less than the reference value, and when the detected value is less than said reference value sets the current voltage as the actuation voltage.

DESCRIPTION OF THE PREFERRED EMBODIMENT

Figure 1:
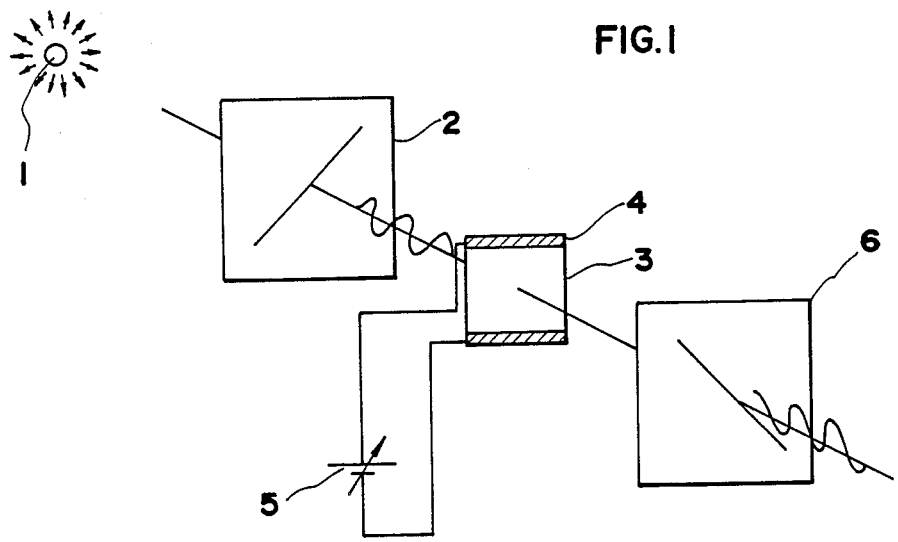
FIG. 1 shows the operating conditions of the optical shutters.
Figure 2:
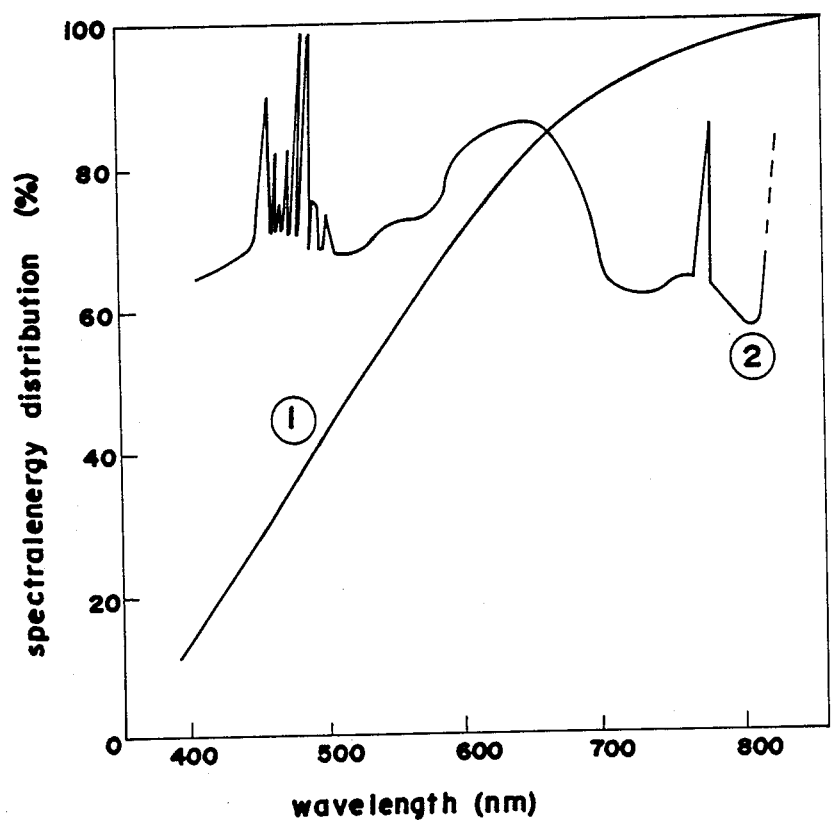
FIG. 2 shows the spectral energy distributions for light generated by halogen and xenon lamps in a fixed wavelength range.
Figure 3:
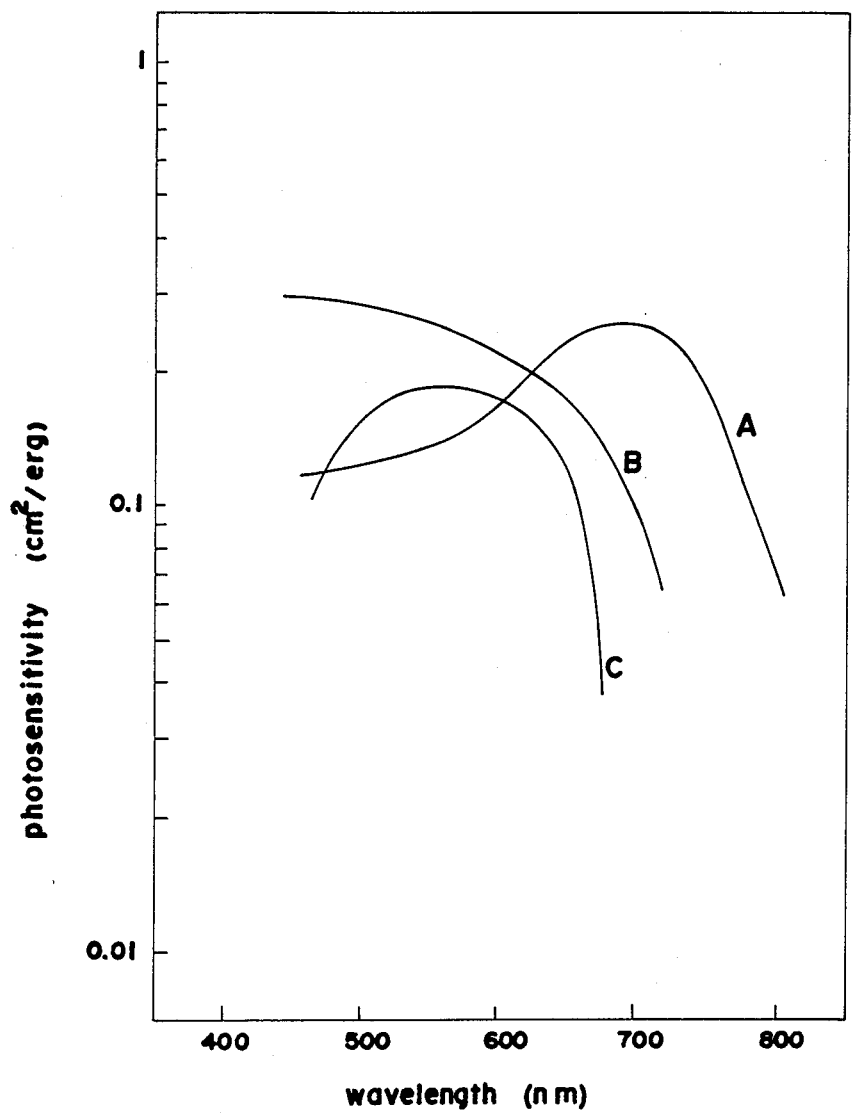
FIG. 3 shows spectral sensitivity characteristics for three representative types of photosensitive member.
Figure 4:
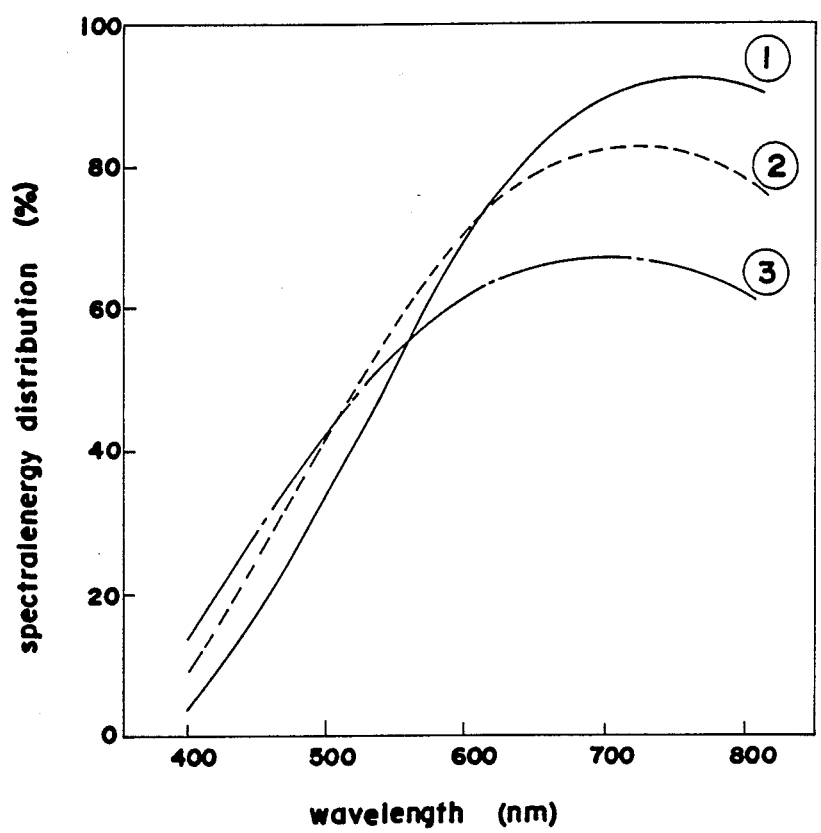
FIGS. 4 and 5 show spectral energy distributions of light in a fixed wavelength range transmitted by halogen and xenon lamps when the actuation voltage applied to the optical shutters is changed.
Figure 5:
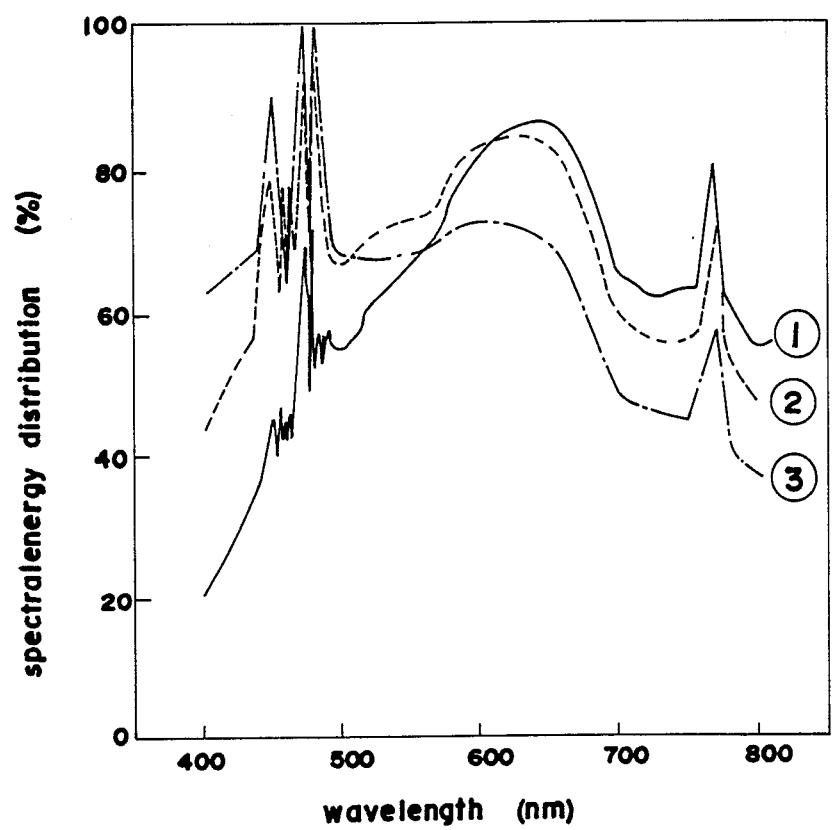
Figure 6A:
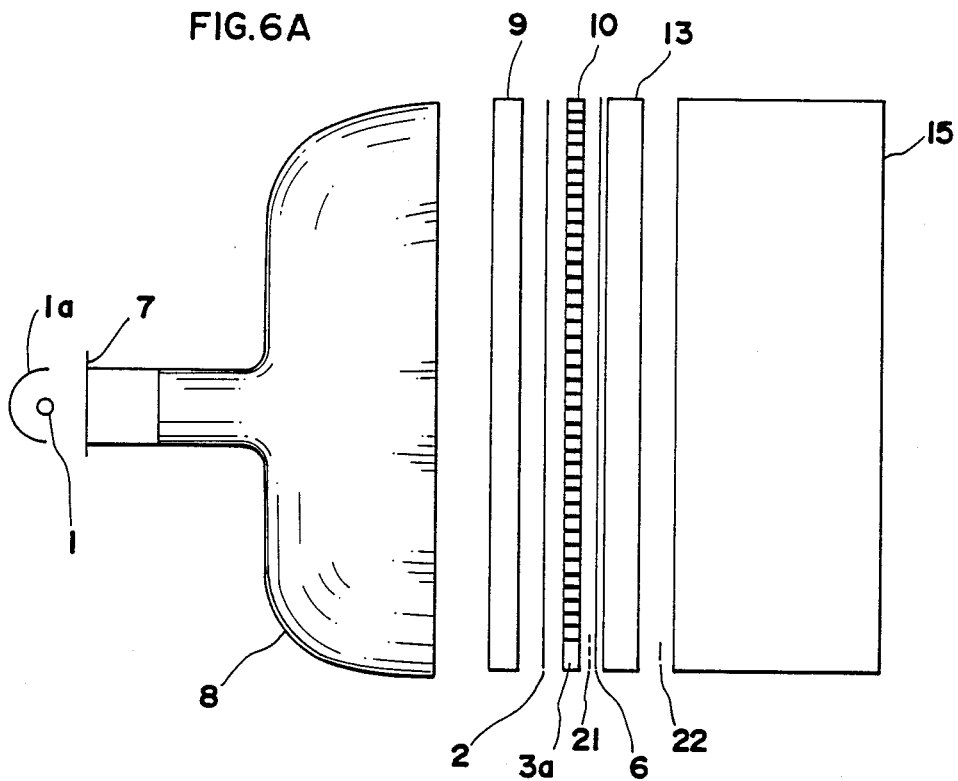
FIGS. 6(A) and 6(B) are a plan view and side elevation views, respectively, of the optical system of the image forming apparatus used in an embodiment of the invention.
Figure 6B:
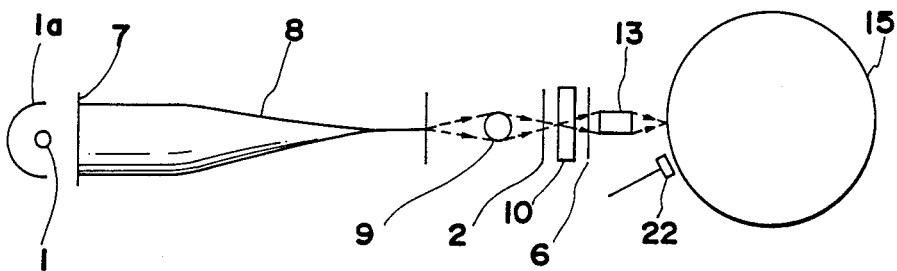

An embodiment of the present invention is hereinafter described with reference to FIGS. 6(A) and 6(B) through FIG. 13.

The image forming apparatus using the present embodiment of the invention operates such that light from light source 1 and light reflected by reflecting mirror 1a disposed rearwardly therefrom pass through infrared filter 7 to optical fiber 8, the light from said optical fiber 8 being condensed by rod lens 9 and passing through polarizer 2 to illuminate optical shutter array 10.

Figure 7:
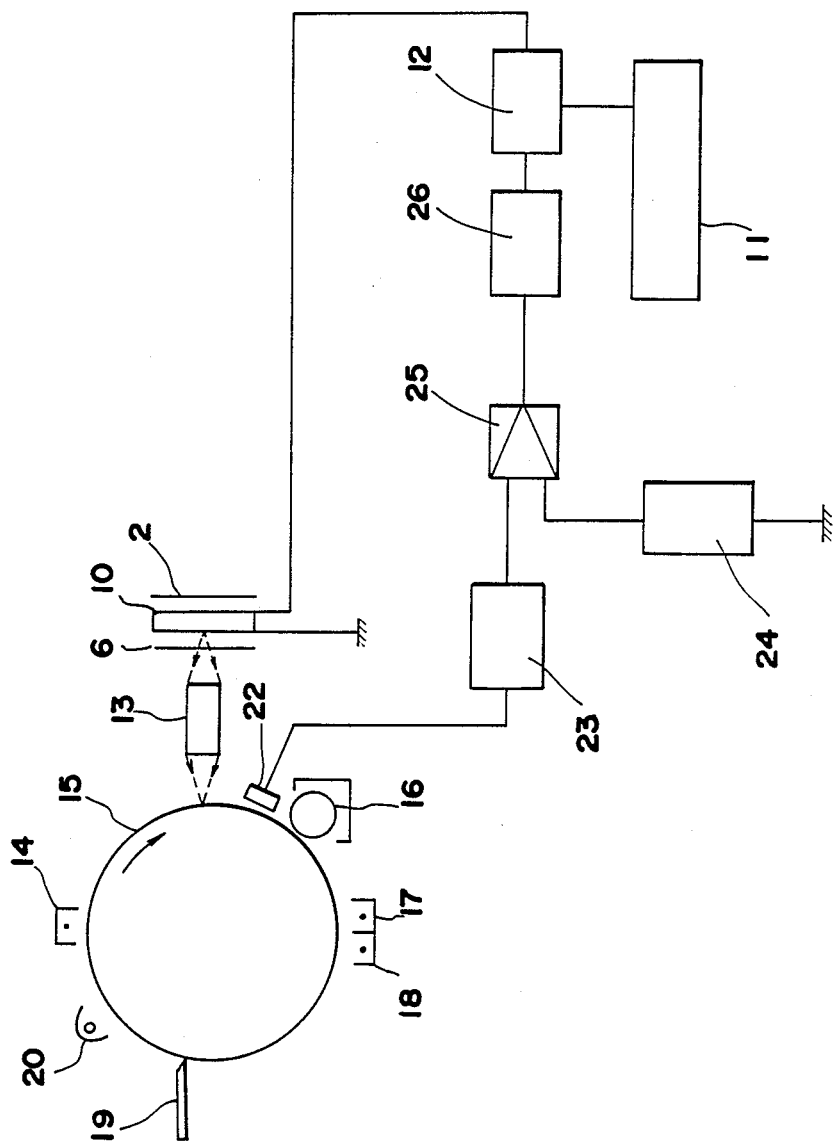
FIG. 7 shows an example of the actuation voltage control for applying an actuation voltage to the optical shutters.

Then, as shown in FIG. 7, an actuation voltage is applied to the appropriate optical shutter 3 through optical shutter actuation circuit 12 based on image signals from image signal generation circuit 11, the light illuminating said optical shutter 3 is polarized and transmitted through analyzer 6, the light is then condensed by focusing rod lens array 13 and photosensitve member 15 which was charged by charger 14 is exposed to said condensed light so as to form an electrostatic latent image thereon.

After an electrostatic latent image is thus formed on photosensitive member 15, toner is affixed to said electrostatic latent image by developing device 16 so as to form a toner image on the surface of photosensitive member 15, said toner image is thereafter transferred to recording paper using transfer charger 17 and separation charger 18, and residual toner remaining on the surface of photosensitive member 15 is removed by cleaning member 19, then the surface of photosensitive member 15 is discharged by an eraser lamp 20, as shown in FIG. 7.

Figure 8:
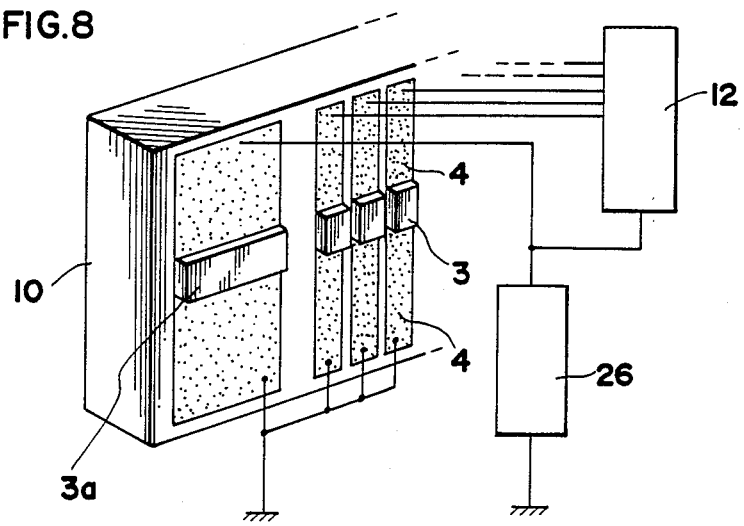
FIG. 8 is a perspective view of the end portion of the optical shutter array.

In the present embodiment an monitoring optical shutter 3a is provided outside the printing region at the end of optical shutter array 10. When the actuation voltage to be applied to optical shutter 3 is determined by optical shutter actuation circuit 12, as shown in FIG. 8, light condensed by the aforesaid rod lens 9 passes through polarizer 2 and illuminates the aforesaid monitoring optical shutter 3a.

Next, a suitable actuation voltage is applied to said monitoring optical shutter 3a, whereupon the transmitted light is polarized in said monitoring optical shutter 3a and passes through light reducing filter 21 and analyzer 6. This transmitted light is then condensed by focusing rod lens array 13 and exposed upon photosensitive member 15 which has been charged by charger 14, so as to reduce the surface potential of said photosensitive member 15.

The thus reduced surface potential of photosensitive member 15 is measured by surface electrometer 22 and converted to a signal voltage (detected value Vs) by transducer 23. Comparator 25 then compares the reference voltage (reference value Vo) set in reference voltage generator 24 for adequate exposure of photosensitive member 15 with the signal voltage value Vs, and the result is output. The actuation voltage applied to optical shutter 3 is regulated in the control portion of variable voltage power unit 26 based on the aforesaid output from comparator 25.

Figure 9:
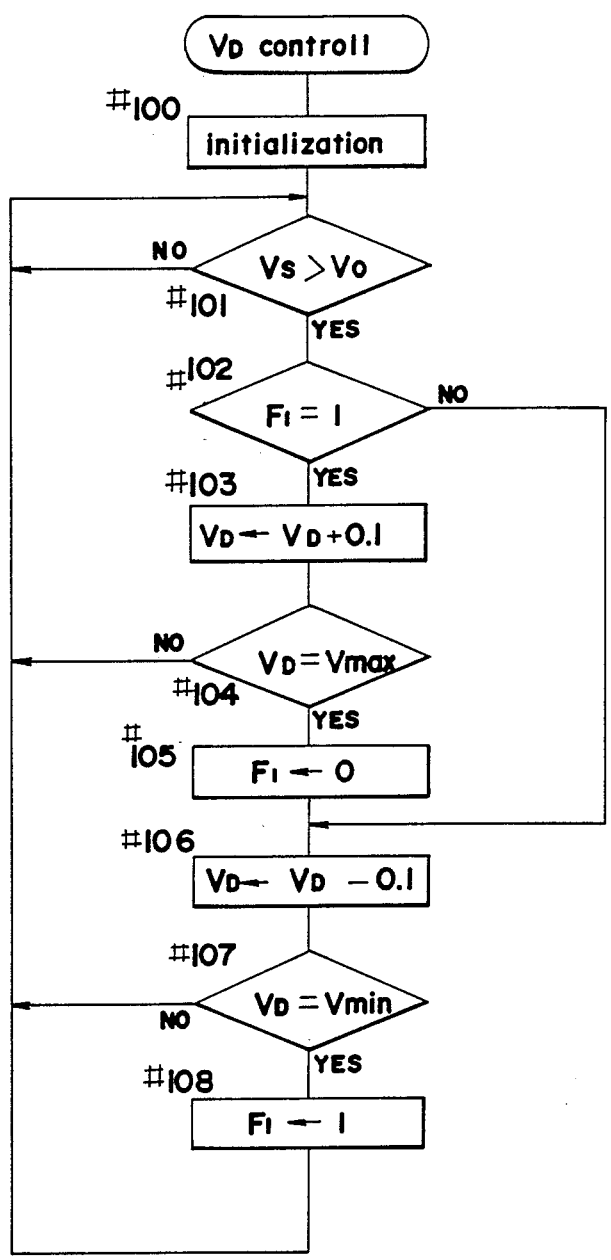
FIG. 9 is a flow chart showing an example of the actuation voltage control executed in the control portion of the variable voltage power unit.

FIG. 9 is a flow chart showing an example of actuation voltage control executed in the control portion of variable voltage power unit 26.

When the power is switched ON, initialization is executed in step 100. ADD flag F1 is set at 1 at initialization.

Comparator 25 compares the detected value Vs from surface electrometer 22 with the pre-set reference value Vo, and outputs either a HIGH signal when $V_s \leq V_o$, or a LOW signal when Vs>Vo. In step 101, it is determined whether or not Vs>Vo based on the aforesaid output from comparator 25. If Vs is greater than Vo, the routine continues to step 102, and if Vs less than or equal to Vo the process is repeated.

In step 102, A determination is made as to whether or not the ADD flag F1 is set at 1. The ADD flag F1 is set at 1 during processing which increases the actuation voltage $V_D$, and is set at 0 (zero) during processing which reduces $V_D$. When ADD flag F1 registers 1 the routine continues to step 103, and when F1 registers 0 the routines continues to step 106.

In step 103, the actuation voltage $V_D$ is increased 0.1 V, then in step 104 a determination is made as to whether or not $V_D$ has reached a pre-set upper limit value Vmax. If $V_D$ equals Vmax the routine continues to step 105. If $V_D$ has not reached Vmax the routine returns to step 101 and the aforesaid process is repeated.

In step 105, the ADD flag F1 is set at 0. This resetting process indicates that the direction of $V_D$ variation has been changed in the reducing direction because $V_D$ reached the upper limit in step 104. Next, in step 106 $V_D$ is reduced by 0.1 V.

In step 107, a determination is made as to whether or not $V_D$ has reached a pre-set lower limit Vmin. If $V_D$ equals Vmin, the ADD flag is set at 1, and the direction of $V_D$ variation is changed. If $V_D$ has not reached the lower limit, the routine returns to step 101 and the previously described process is repeated.

A suitable actuation voltage can be regulated through the execution of the aforesaid processes even when the reduction of surface potential of the photosensitive member is greater than the reference value.

Accordingly, when an actuation voltage for optical shutter 3 is set in the aforesaid manner, a suitable actuation voltage for the exposure of photosensitive member 15 and the formation of an electrostatic latent image thereon, i.e., an actuation voltage corresponding to the type of light source 1 used and the spectral sensitivity characteristics of photosensitive member 15, can be applied to optical shutter 3 without checking the type of said light source 1 or the spectral characteristics of said photosensitive member 15.

In the present embodiment, photosensitive member 15 is exposed to light polarized by monitoring optical shutter 3a and transmitted through analyzer 6. Light polarized by monitoring optical shutter 3a as described above passes through light reducing filter 21 and analyzer 6 so that the quantity of light conducted to photosensitive member 15 is minimized.

Figure 10:
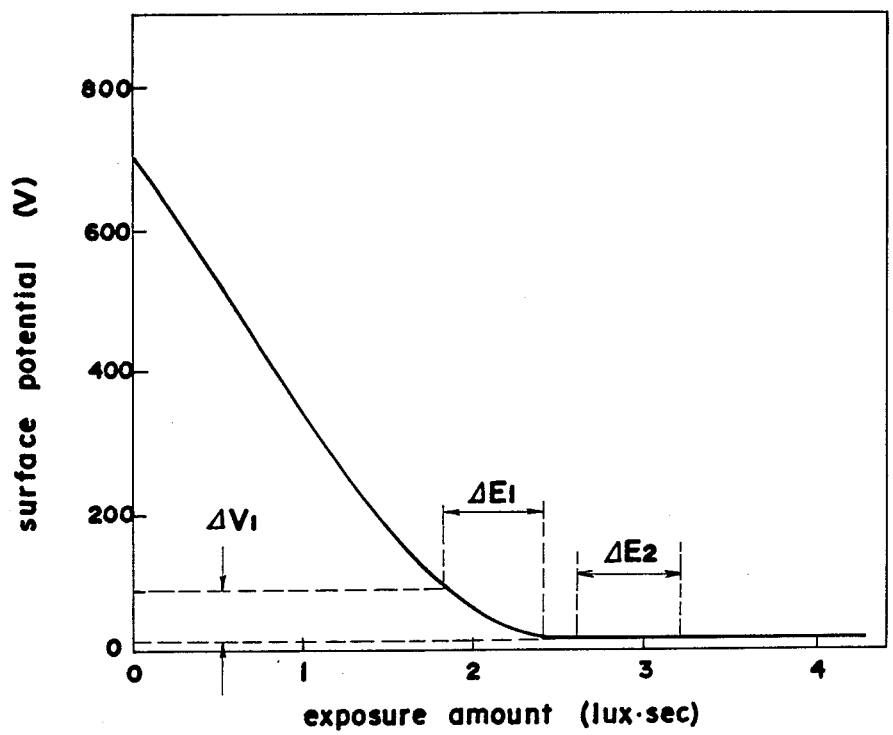
FIG. 10 shows the relationship between the quantity of exposure light and the decrease in surface potential of the photosensitive member.

FIG. 10 shows the correlation between the amount of exposure light and the reduction in surface potential of the photosensitive member during exposure of said photosensitive member. Since the difference in surface potential $\Delta V$ induced by a change in the quantity of exposure light $\Delta E$ becomes nearly immeasurable when the photosensitive member is adequately exposed, the optimum actuation voltage can be set by measuring the reduction in surface potential in the sloped portion where the reduction in surface potential induced by changing the amount of exposure light can be precisely measured.

Figure 11:
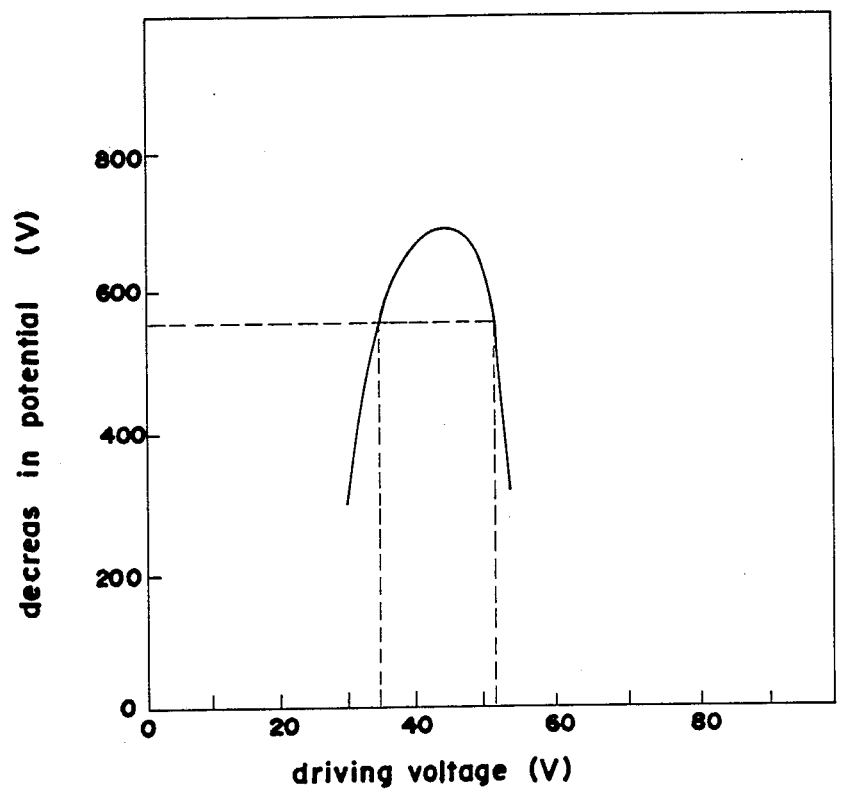
FIG. 11 shows the relationship between the actuation voltage applied to the optical shutters and the decrease in surface potential of the photosensitive member.

FIG. 11 shows the general correlation between the actuation voltage applied to the optical shutter and the amount of reduction in surface potential of the photosensitive member. Although setting the actuation voltage to maximize the amount of surface potential reduction is the ideal, said actuation voltage may be set within a range which allows an adequate degree of reduction in said surface potential.

Figure 12:
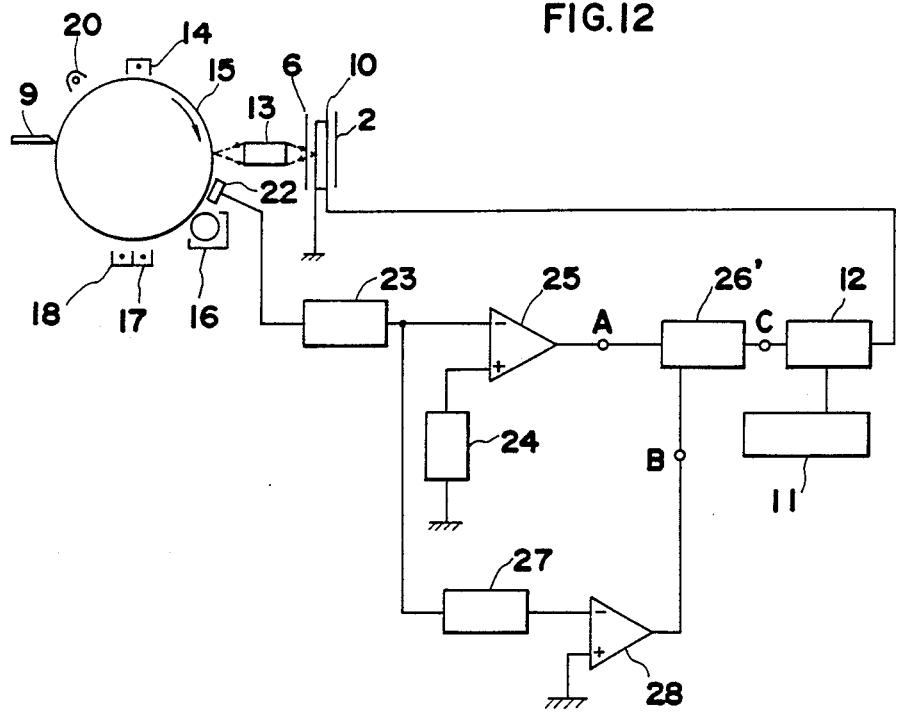
FIG. 12 shows another example of actuation voltage control for applying the actuation voltage to the optical shutters.
Figure 13:
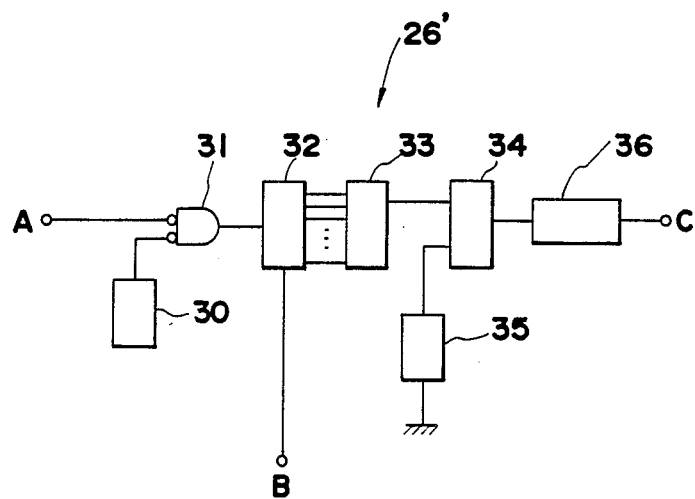
FIG. 13 shows details of the variable voltage power unit.

FIGS. 12 and 13 shows another embodiment of the actuation voltage control of the present invention.

First, the surface potential of the photosensitive member which has been reduced by exposure to light, is detected by electrometer 22 and converted to an electrical signal (detected value Vs) by transducer 23. The aforesaid detected value Vs is input to comparator 25 and differentiator 27. Comparator 25 compares the detected value Vs with the reference value Vo set in reference voltage generator 24, and the result is output to variable voltage power unit 26'.

The detected value Vs input to differentiator 27 is differentiated and subsequently input to comparator 28 to determine the direction of change in the surface potential. Comparator 28 then outputs the result to the variable voltage power unit.

In variable voltage power unit 26', the signal input from comparator 25 controls the determination of whether or not to change th actuation voltage $V_D$ applied to shutter array 10, while the signal input from comparator 28 controls the direction of change (incrementation or decrementation) of said actuation voltage.

The signal from comparator 25 is input to AND gate 31 in variable voltage power unit 26', as shown in FIG. 13. When the aforesaid signal indicates Vs is greater than Vo, a signal from pulse generator 32 which is normally input to AND gate 31 is instead input to counter 32 and said counter starts incrementation. Then an analog signal converted by D/A converter 33 and a bias DC voltage are added by adder circuit 34, and power source 36 is controlled in accordance with said added signal to increase the voltage input to the optical shutter actuation circuit.

Detected value Vs has a tendency to rise higher and higher as the actuation voltage is increased in the manner described above. Therefore, the detected value Vs is input to counter 32 via differentiator 27 and comparator 28 as a signal expressing the direction of change to switch the counting direction of said counter 32 between incrementation and decrementation. Thus, the actuation voltage can be prevented from being changed in the direction departing from the optimum value.

What is claimed is:

1. An image forming apparatus comprising:

an optical shutter array having a plurality of optical shutters constructed of material possessing electro-optical effects;

polarizing member provided on the entering light side of the optical shutter array;

analyzing member provided on the exiting light side of the optical shutter array;

actuation voltage impression means for applying an actuation voltage to the optical shutter array based on image signals;

a photosensitive member on which an electrostatic latent image is formed by exposure to light transmitted through the optical shutter array;

detecting means for detecting a decayed surface potential of the photosensitive member induced by light exposure;

compensating means, when the detected value by the detecting means is greater than a predetermined reference value, for changing the actuation voltage applied to the optical shutters until said detected value is less than the reference value; and control means, upon detection of the detected value to be less than said reference value, for setting the compensated voltage as a compensated actuation voltage to be applied to the optical shutter array.

2. An image forming apparatus of claim 1, wherein said optical shutters are constructed of PLZT.

3. An image forming apparatus comprising:

an optical shutter array having a plurality of optical shutters constructed of material possessing electro-optical effects;

polarizing member provided on the entering light side of the optical shutter array;

analyzing member provided on the exiting light side of the optical shutter array;

actuation voltage impression means for applying an actuation voltage to the optical shutter array based on image signals;

a photosensitive member on which an electrostatic latent image is formed by exposure to light transmitted through the optical shutter array;

monitoring optical shutter means provided outside the region of forming the electrostatic latent image and at the end of said optical shutter array;

detecting means for detecting a decayed surface potential of the photosensitive member induced by light exposure through said monitoring optical shutter;

compensating means, when the detected value by the detecting means is greater than a predetermined reference value, for changing the actuation voltage applied to the optical shutters until said detected value is less than the reference value; and control means, upon detection of the detected value to be less than said reference value, for setting the compensated voltage as a compensated actuation voltage to be applied to the optical shutter array.

4. An image forming apparatus of claim 3, wherein said optical shutters are constructed of PLZT.

5. An image forming apparatus of claim 3, wherein said monitoring optical shutter means is constructed of PLZT.

6. An image forming apparatus of claim 3, further including a light reducing filter is provided between said monitoring optical shutter means for minimizing the quantity of light conducted to the photosensitive member.

7. An image forming apparatus comprising:

an optical shutter array having a plurality of optical shutters constructed of material possessing electro-optical effects;

polarizing member provided on the entering light side of the optical shutter array;

analyzing member provided on the exiting light side of the optical shutter array;

actuation voltage impression means for applying an actuation voltage of the optical shutter array based on image signals;

a photosensitive member on which an electrostatic latent image is formed by exposure to light transmitted through the optical shutter array;

detecting means for detecting a decayed surface potential of the photosensitive member induced by light exposure;

compensating means, when the detected value by the detecting means is greater than a predetermined reference value, for changing the actuation voltage applied to the optical shutters until said detected value is less than the reference value, said actuation voltage is compensated by varying the voltage between first and second points to locate the suitable compensated voltage;

switching means, when the detected value shows a tendency to rise higher in accordance with the change of the actuation voltage by said compensating means, for switching a varying direction of the actuation voltage; and control means, upon detection of the detected value to be less than said reference value, for setting the compensated voltage as a compensated actuation voltage to be applied to the optical shutter array.

* * * * *